Oct. 27, 1925.
W. H. CLEGG
1,559,503
TRUCK BRAKE
Filed Oct. 5, 1923
3 Sheets-Sheet 2
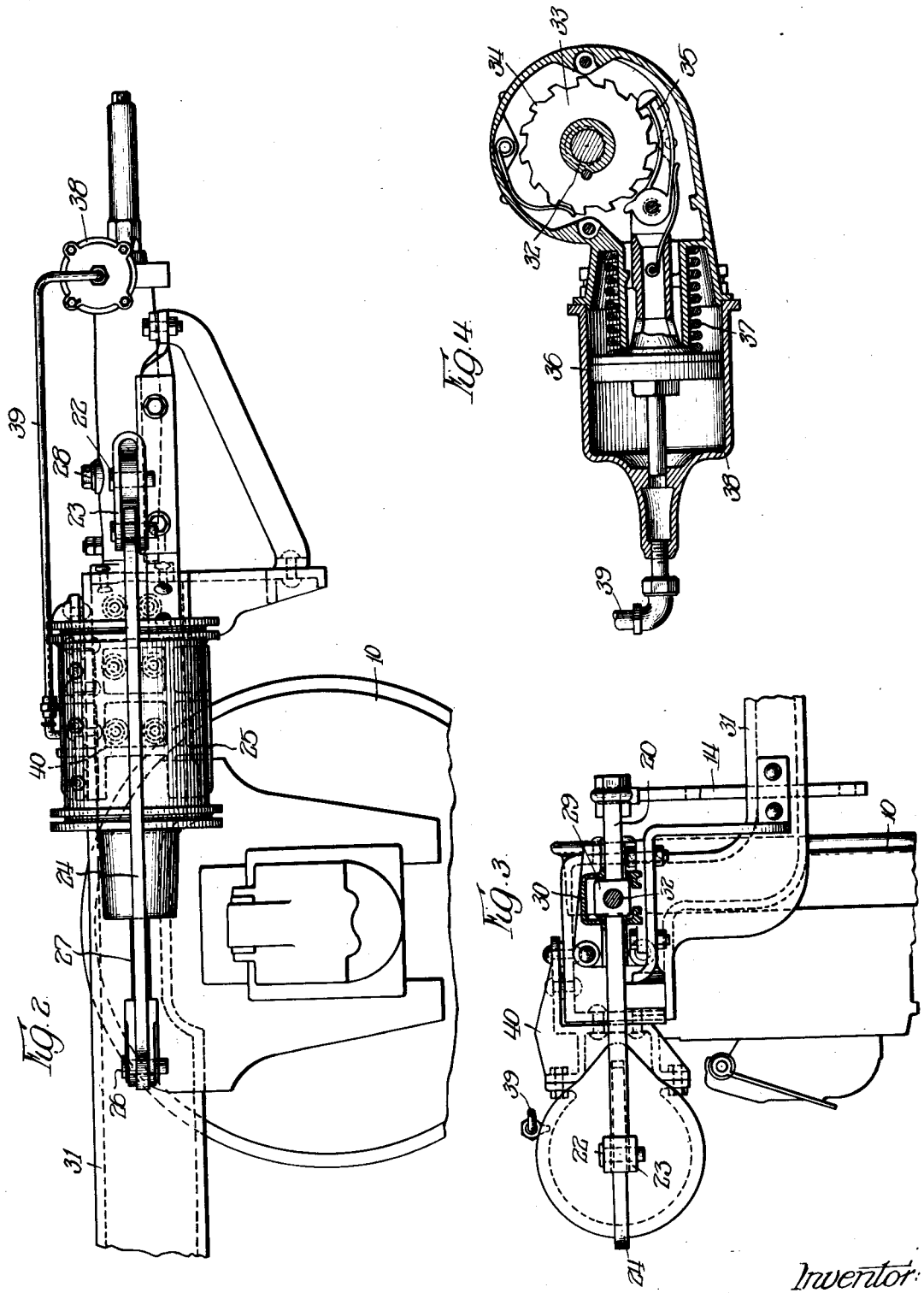
Witness:
R. Burkhardt.
Inventor:
William H. Clegg,
By Wilkinson, Huxley, Byron & Knight
attys Oct. 27, 1925.
W. H. CLEGG
1,559,503
TRUCK BRAKE
Filed Oct. 5, 1923
3 Sheets-Sheet 3
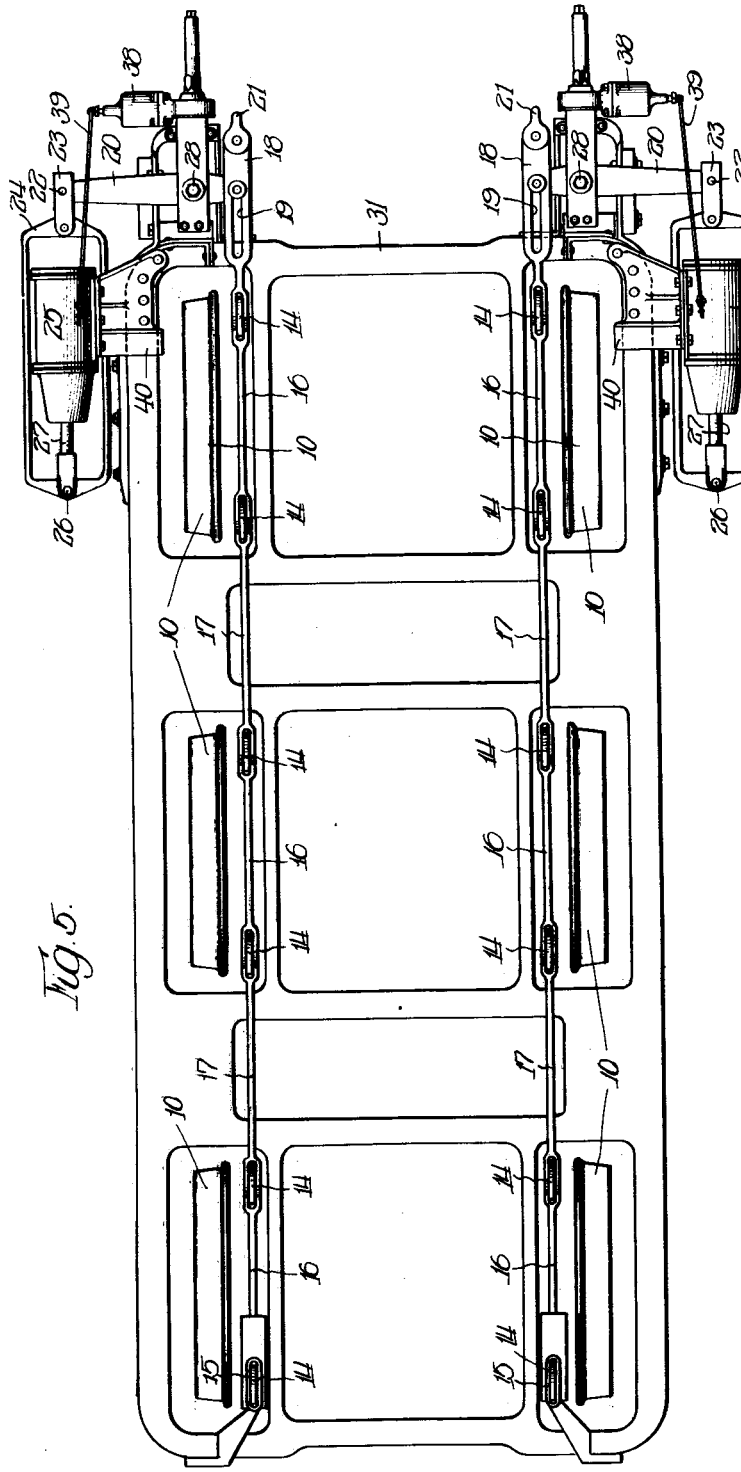
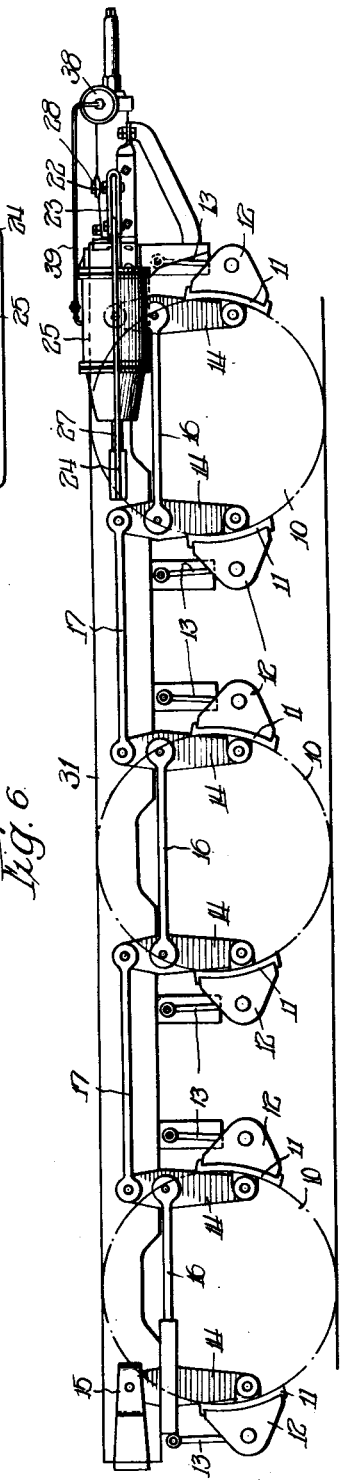
Witness:
R. Burkhardt.
Inventor:
William H Clegg,
By Wilkinson, Huxley, Byron & Knight
Attys.

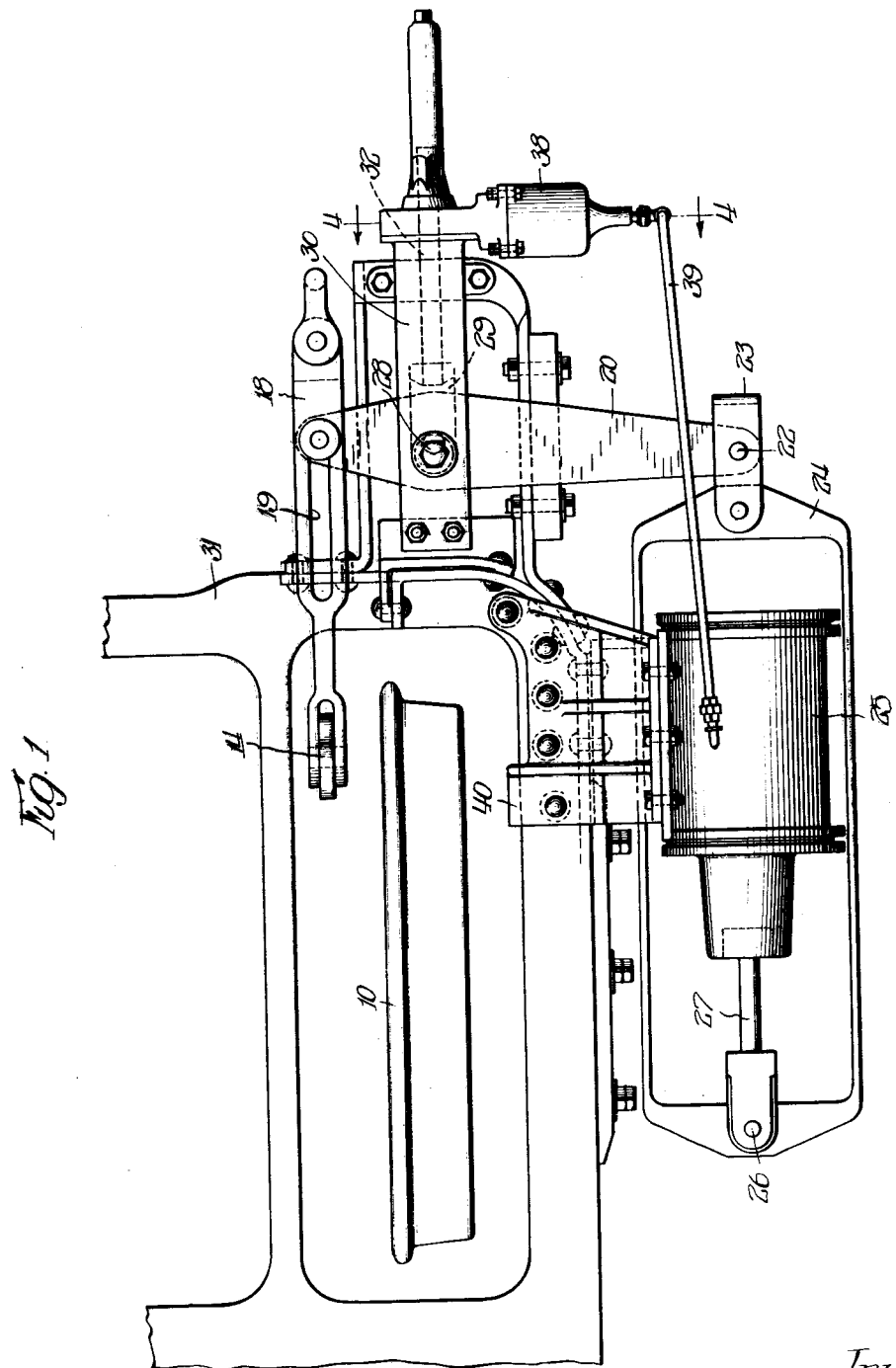

Patented Oct. 27, 1925.

1,559,503

UNITED STATES PATENT OFFICE.

WILLIAM H. CLEGG, OF MONTREAL, CANADA, ASSIGNOR TO AMERICAN STEEL FOUNDRIES, OF CHICAGO, ILLINOIS, A CORPORATION OF NEW JERSEY.

TRUCK BRAKE.

Application filed October 5, 1923. Serial No. 666,670.

*To all whom it may concern:*

Be it known that I, WILLIAM H. CLEGG, a subject of the King of Great Britain, residing at Montreal, in the Province of Quebec and Dominion of Canada, have invented certain new and useful Improvements in Truck Brakes, of which the following is a specification.

This invention relates to brake mechanism and more particularly to truck brakes for railway cars.

One object of the invention is to provide simple and compact brake mechanism in which the various parts are accessible and clearance conditions are improved.

Another object is to provide an improved brake arrangement in which two cylinders per truck are connected to clasp brakes in a manner to meet all of the service requirements for successful operation.

These and other objects are accomplished by means of the arrangement disclosed on the accompanying sheets of drawings, in which—

Figure 1 is a fragmentary top plan view of a railway car truck embodying my invention;

Figure 2 is a fragmentary side elevation of the same arrangement;

Figure 3 is a fragmentary front end view of the same arrangment, parts being in section for the sake of clearness;

Figure 4 is a fragmentary sectional view taken in the plane of line 4—4 of Figure 1;

Figure 5 is a somewhat diagrammatic top plan view of a complete truck equipped with my improved brake mechanism; and Figure 6 is a side elevation of the arrangement shown in Figure 5.

The various novel features of the invention will be apparent from the following description and drawings and will be particularly pointed out in the appended claims.

This invention is illustrated in connection with a six wheel truck provided with a clasp brake rigging, opposite sides of each wheel 10 of each set being engaged by brake shoes 11 carried by brake heads 12 which are supported by the usual hangers 13. Each brake head is actuated by a truck lever 14, the lower end of each of which is operatively connected to the associated brake head. The dead truck lever is pivotally connected at its upper end to any suitable bracket 15 or portion of the truck. The truck levers 14 for each wheel are connected intermediate their ends by a tension rod 16. Truck levers for the adjacent wheels are connected at their upper ends by tension rods 17.

The live truck lever 14 in each case, there being two separate braking units to each truck or four per car, is pivotally connected to a bar 18 provided with an elongated slot 19 in which the inner end of a cylinder operated lever 20 is movably mounted. Normally the inner end of said cylinder lever 20 engages the outer extreme wall of the slot 19 for applying the brakes when same is done automatically. However, the bar 18 is provided with a clevis 21 by means of which the brakes may be hand operated. By means of the slot, a hand operation of the brakes may be accomplished without interfering with the automatic mechanism for operating the brakes.

The outer end of the cylinder lever 20 is pivotally connected at 22 to a link 23 which in turn is pivotally connected to one end of a yoke 24 which incloses the associated brake cylinder 25. The opposite end of the yoke 24 is pivotally connected at 26 to a piston rod 27 which in turn is connected to the piston, not shown, within the cylinder 25. The cylinder lever 20 being fulcrumed at an intermediate point at 28, it is apparent that when the yoke 24 is moved to the left as shown in the various figures of the drawings, the brakes will be applied and when the yoke 24 is moved to the right the brakes will be released. In the event that there is an excess of slack in the brake rigging the cylinder lever 20 is caused to angle an excessive amount unless some means is provided to take up the slack. The ideal arrangement is to have the cylinder lever 20 at right angles to its associated operating rod 18 when the brakes are applied and new wheels, and shoes worn to one and one eighth inch thickness, are in use. Such is substantially the arrangement shown in the figures of the drawings. Referring particularly to Figure 1, it will be appreciated that if the cylinder lever 20 is caused to pivot an excessive amount in applying the brakes, the inner end of the lever would be caused to travel somewhat outwardly with respect to the side of the truck thereby transmitting a pull upon the brake rigging which is not entirely in a plane parallel with the plane of the truck wheels. Accordingly, it is necessary that the cylinder lever 20 be actuated in a manner such that the brake rigging be operated by a force exerted in a line parallel to the plane of the truck wheels. To this end, the cylinder lever 20 is fulcrumed at 28 in a block 29 which is slidably mounted in a bracket or yoke 30 properly secured to the trunk frame 31 to take up excess slack. For actuating the block 29 the same is connected to a threaded rod 32 upon which is mounted a travelling nut 33 having ratchet teeth 34 adapted to be engaged and actuated by a pawl 35 in turn actuated in one direction through fluid pressure exerted upon a piston 36 and in the opposite direction by a spring 37 mounted in a cylinder 38 having an air connection 39 with the brake cylinder 25. The relation between the brake cylinder 25 and the slack adjuster 38 is such that when there is an excessive amount of slack in the brake rigging the nut 33 is caused to travel on rod 32 for varying the position of the block 29 or fulcrum point 28 of the cylinder lever 20.

The brake cylinder 25 preferably is secured to a bracket 40 which in turn in each case is secured to the inner side corner of the truck frame 31, the cylinder 25 in each case extending outwardly from the side of the truck frame. By having the yoke 24 surrounding the brake cylinder 25, a balanced straight line action is transmitted between the piston and the point 22 at which the cylinder lever 20 is pivotally connected to the link 23 in turn connected to the yoke 24.

This unit brake cylinder type of clasp brake rigging is relatively simple in construction and operation and has its parts arranged so that same are accessible and clearance conditions are improved and the general operation is such as to meet the various requirements under service conditions.

It is my intention to cover all modifications of the invention falling within the spirit and scope of the following claims.

I claim:
1. In brake mechanism, the combination of a truck brake lever, a brake cylinder, a yoke surrounding said cylinder and operatively connected thereto, and a lever operatively connected to said yoke and to said truck brake lever by means of which the brakes are operated.

2. In brake mechanism, the combination of a truck brake lever, a brake cylinder, a yoke surrounding said cylinder and operatively connected thereto, and a lever operatively connected to said yoke and to said truck brake lever by means of which the brakes are operated, and slack adjuster means for varying the position of said cylinder operated lever in accordance with requirements.

3. In a railway car truck, the combination of a truck frame, a brake cylinder secured to said truck frame at the inner end of one side of said frame, a yoke surrounding said cylinder and operated therefrom, a truck lever, and a lever operatively connected to said yoke and to said truck lever for transmitting braking movements.

4. In brake mechanism, the combination of a brake cylinder, a yoke surrounding same and operatively connected theret whereby it is actuated therefrom, a link pivotally connected to said yoke, a truck brake lever, and a lever pivotally connected to said link and operatively connected to said truck lever.

5. In brake mechanism, the combination of a brake cylinder, a yoke surrounding same and operatively connected thereto whereby it is actuated therefrom, a link pivotally connected to said yoke, a truck brake lever, a cylinder operated lever pivotally connected to said link and operatively connected to said truck lever, and slack adjuster means for varying the position of said cylinder operated lever in accordance with requirements.

Signed at Montreal, Quebec, this 28th day of September, 1923.

WILLIAM H. CLEGG.